May 10, 1960    G. E. GAGNIER    2,935,770
WEATHER STRIP ASSEMBLY AND FASTENER
Filed July 21, 1954    2 Sheets-Sheet 1
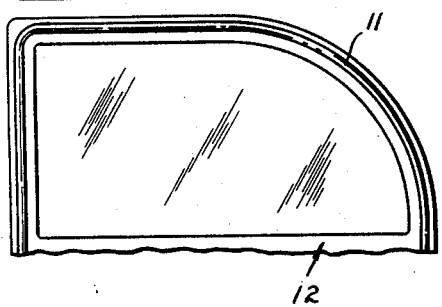
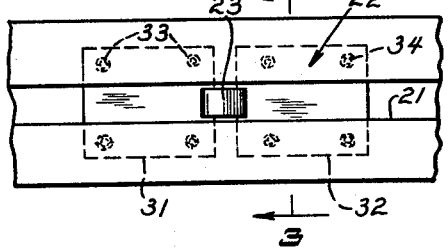
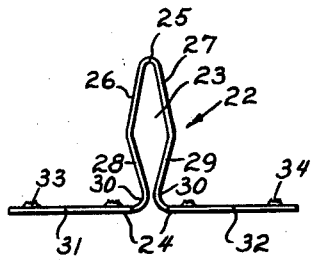
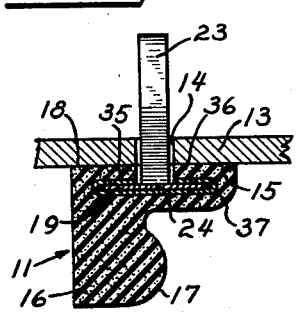
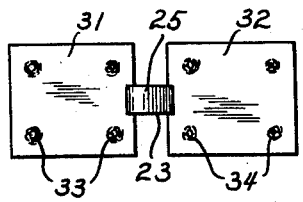
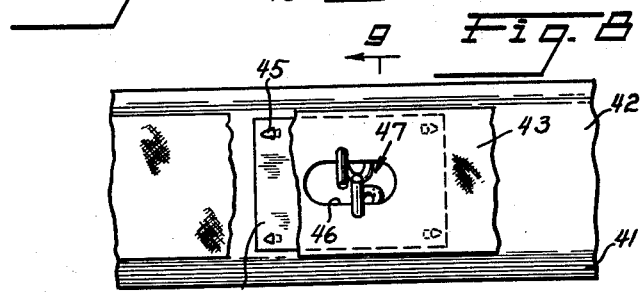
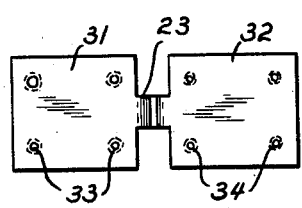
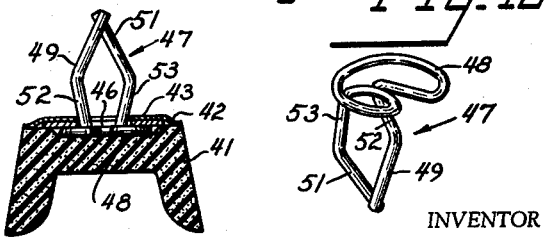
INVENTOR
GEORGE E. GAGNIER
BY Strauch, Nolan + Diggins
ATTORNEYS May 10, 1960  G. E. GAGNIER  2,935,770
WEATHER STRIP ASSEMBLY AND FASTENER
Filed July 21, 1954  2 Sheets-Sheet 2
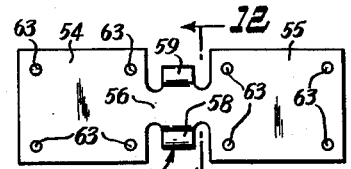
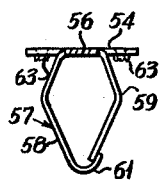
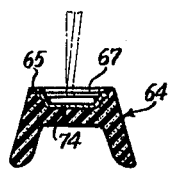
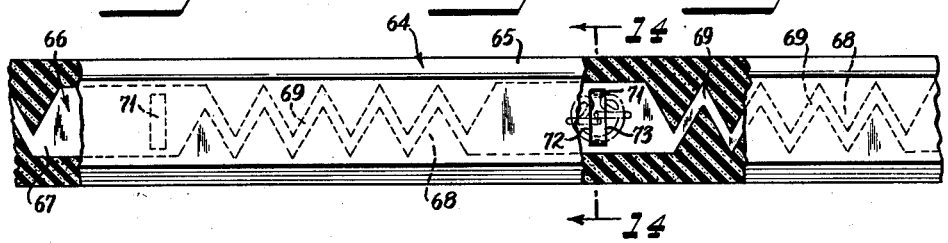
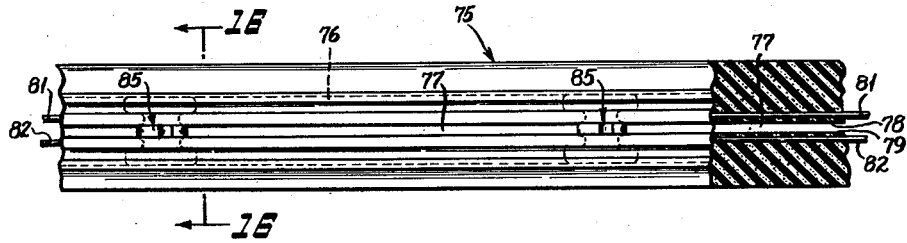
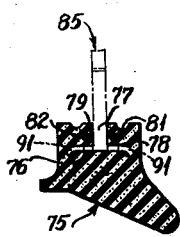
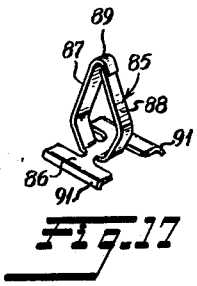
INVENTOR
GEORGE E. GAGNIER
BY Strauch, Nolan & Diggins
ATTORNEYS United States Patent Office 2,935,770
Patented May 10, 1960

2,935,770

WEATHER STRIP ASSEMBLY AND FASTENER

George E. Gagnier, Detroit, Mich., assignor to Gagnier Fibre Products Company, Oak Park, Mich., a corporation of Michigan Application July 21, 1954, Serial No. 444,770

1 Claim. (Cl. 20—69)

This invention relates to the fastening of sponge rubber and like soft pliable strips along the edges of automobile doors and like closures to seal these closures all around the edge in closed position to render them tight against the entry of dust and moisture into the interior of the vehicle, and particularly to novel arrangements for snap fastening these strips to a rigid supporting frame.

In its preferred embodiment the invention will be described as applied to a sponge rubber weather or like soft tough resilient strip that runs in a continuous loop all around the edge of an automobile door wherein the sponge rubber strip contacts a flat surface about the perimeter of the door opening and is thereby compressed to seal against entry of water and dirt.

It is therefore the major object of my invention to provide a novel arrangement for fastening a soft compressible rubber strip about the periphery of an opening to be closed or a closure member therefor wherein a series of fasteners are spaced along the length of the strip prior to assembly of the strip with the support on which it is to be mounted and wherein the fastener is so secured to the strip that it cannot be dislodged from the strip during normal usage without tearing the rubber, but may be dislodged from the strip if desired without injuring the strip for replacing the fastener or for some other purpose.

It is a further object of my invention to provide a novel detachable lengthwise stretchable sealing strip assembly comprising a continuous body of rubber or like soft plastic material wherein a series of fasteners are fixedly mounted along the back surface of the strip in predetermined spaced relation in such a manner that they remain assembled with the strip as it is being snapped into the support, and when so applied they hold the strip firmly and tightly upon the support so as to seal the space between the strip and the support.

It is a further object of my invention to provide a novel weather strip assembly comprising a continuous body of resilient material like rubber, having along its back a substantially T-shaped slot containing a series of spaced snap fasteners each of which is mechanically anchored in the slot and has a shank which when the strip is applied to a support enters a hole in that support and automatically maintains the strip tightly in engagement with the support.

A further object of the invention is to provide a novel fastener made preferably of a single piece of sheet metal comprising spaced planar head portions having sharp material perforating projections and extending in opposite directions from the open end of a shank which has a closed end remote from the head and which has oppositely sloping diverging and converging leg portions so that the shank successively contracts and expands upon entering a hole in the support to prevent accidental withdrawal and coact with the hole sides to maintain the fastener and the strip into sealed tight engagement with the support.

It is a further object of this invention to provide a novel soft but tough continuous compressible resilient strip of rubber or the like adapted on its front surface to engage and be compressed against the perimeter of a closure to be sealed and having on its rear surface a strip of muslin or like fabric or equivalent that is tougher than the rubber and has a limited longitudinal stretch in the direction of the strip length permanently bonded to the rubber, and there being secured between the fabric and the rubber at spaced intervals a series of thin rigid plates each having an opening for receiving the head of a snap fastener.

Further objects of the invention will appear as the description proceeds in connection with the appended claim and the annexed drawings wherein:

Figure 1 illustrates in fragmentary side elevation the upper part of an automobile door along the perimeter of which the weather strip of the invention is secured to provide a weatherproof seal;

Figure 2 is a rear view of the weatherstrip assembly according to one embodiment of the invention, and it also illustrates a novel fastener of my invention in the combination;

Figure 3 is a section through the assembly of Figure 2 and illustrates further how the fastener is mounted in the assembly;

Figures 4, 5, 6 and 7 are side, end, bottom and top views, respectively, of the fastener of Figures 2 and 3.

Figure 8 is a rear view of a weather strip and fastener assembly according to a further embodiment of my invention particularly illustrating the fabric and perforated plate arrangement by which a conventional snap fastener is mounted on the rear side of the compressible strip;

Figure 9 is a section on line 9—9 of Figure 8 illustrating the manner of securing the fastener to the weather strip;

Figure 10 is a generally perspective view of a conventional type snap fastener which may be used in the assembly of Figure 8;

Fig. 11 is a top plan view of a fastener which may be used in place of that of Figures 4–7;

Figure 12 is a section on line 12—12 of Figure 11;

Figure 13 is a rear elevation of a weatherstrip assembly according to a further embodiment of the invention;

Figure 14 is a section on line 14—14 of Figure 13;

Figure 15 is a rear elevation of another weatherstrip assembly according to the invention;

Figure 16 is a section on line 16—16 of Figure 15; and

Figure 17 is a perspective view of a form of fastener usable in the assembly of Figure 15.

The problem of attaching sponge rubber weather strips along the edge of an automobile door, trunk deck or the like has given considerable difficulty, particularly where the frame to which the strip must be attached is of the sheet metal. In sheet metal bodies today a series of holes are punched in the support by the manufacturer and the weatherstrip assembly must be capable of suiting those holes which may vary widely in spacing so that accurately dimensioned fastener locations along the weather strip are not particularly possible. Also during the life of the vehicle the fastener may become rusted, or broken, or otherwise impaired when the strip is detached. It is imperative that the fastener be attached to the strip by a securing means that is strong enough to prevent the fastener from pulling out of the hole in the metal support during normal operation such as in summertime conditions when all steel bodies tend to become heated by the sun and the rubber of the weatherstrip may stick to the edge of the door frame. The same condition may occur in the winter time where under severe low temperatures moisture freezes the rubber strip to the frame destroying the rubber when the door is opened. It is usually desirable that the fasteners be replaceable and this cannot be done readily where the entire length of the weather strip contains the embedded reinforcing member.

In the herein disclosed embodiments of the invention, separate snap fasteners are installed in fixed assembly along the weatherstrip in such a manner as to be anchored at predetermined locations so that they cannot be pulled away from the weatherstrip short of destroying the strip.

Referring to Figures 1, 2 and 3 the weatherstrip 11 is in a susbtantially continuous band all around the perimeter of the automobile door indicated at 12. The door has around its perimeter a continuous flat surfaced member 13 which is rigid with the door frame and is formed with a series of spaced holes 14 made during manufacture of the door and are located at predetermined intervals to receive the snap fasteners of the weatherstrip assembly. Referring to Figure 3, member 13 has such a flat outer surface 15 surrounding each hole 14.

The weatherstrip assembly according to an embodiment of the invention comprises a single length strip of rubber 16, usually sponge rubber which is highly compressible and elastic enough to re-expand and maintain a good seal during the life of the door, and the front surface of this strip of rubber, generally designated at 17, is shaped and adapted to contact a body surface all around the door opening and be compressed in a manner which is well known. The rear face of the strip, indicated at 18, is preferably flat and adapted to lie flush against the surface 15 on the door. A generally T-shaped slot 19 extends along the back of the strip thereby providing along the back face a continuous narrow opening 21 which as shown in Figure 2 extends along the entire strip assembly.

Disposed at spaced intervals along the strip assembly are a series of detachable snap fasteners 22 preferably equal in number to the number of holes 14 in member 13. The preferred structure of each of these fasteners, which are preferably all alike, is shown in Figures 4, 5, 6 and 7. This fastener comprises a shank 23 adapted to enter the support holes 14 and a flat head 24 adapted to lie within the T-slot 19 of the rubber strip. The shank 23 has a closed rounded tip 25. The shank legs extend between tip 25 and the head and comprise divergent portions 26 and 27, and convergent portions 28 and 29 which approach but do not contact each other adjacent to the head.

The head 24 of the fastener comprises opposed wings 31 and 32 each extending integrally away from one of the legs of the shank. The wings are provided on their surfaces on the shank side with sharp anchoring projections 33 and 34 respectively. Wings 31 and 32 are coplanar and identical and are joined to the legs of the shank by rounded throat sections 30.

Preferably fastener 22 is made from a single piece of flexible sheet metal having the required resiliency for shank 23 and stiffness for head 24 and it will be noted from Figure 4 that in its relaxed state the juncture of the shank legs with the head portions is slightly spaced so as to permit the legs of the shank to contract toward each other during entry of the shank into holes 14 and then re-expand as full entry is completed.

Fastener 22 is mounted in the assembly as shown in Figure 2 with the wings 31 and 32 disposed in longitudinal alignment with the slot 19 the head of which slot is just about of the same as the width of each of the fastener wings, and shank 23 of the fastener projects through the opening 21. The projections 33 and 34 are preferably simple jagged sharp edge projections formed by puncturing the sheet metal wings in a number of places, here four, so that at least two projections on each side of each wing underlies the flexible lips 35 and 36 alongside opening 21. In assembly the fastener 22 is placed in the slot 19 merely by separating the flexible lips 35 and 36 and inserting head 24 sidewise into slot 19. The fastener is anchored in the desired place simply by exerting a little pressure on the lips 35 and 36 until the prongs 33 and 34 pierce them, and so assembled the fastener will retain its position while the strip assembly is being attached along the automobile door.

Preferably also, although this is not essential to all embodiments of the invention, the interior of the T-slot 19 may be lined with a continuous strip of muslin or like material which is designated at 37 and extends the entire length of the strip. The fabric may be so cut that the bias of its weave permits such longitudinal stretch of the strip assembly as may be necessary to enable the successive fastener shanks to be snapped into holes 14 even though the distance between the holes may be slightly greater than the spacing of the fasteners on the strip 11, but it has been found that fabric cut straight across the weave rather than on the bias is actually preferable because it limits undue stretch of the rubber strip beyond that necessary to insert the fasteners. When such a fabric strip 19 is used, the prongs 33 and 34 pierce into the fabric where it underlies lips 35 and 36 and the strip is usually permanently anchored to the rubber as by a good adhesive or by vulcanization.

During assembly the entire weather strip assembly is first prepared by mounting the fasteners 22 at the desired spaced portions along the length of the strip. No particularly accurate measurement is necessary, it is only necessary to locate the fasteners at the approximate location corresponding to spacing of the holes 14. Then one fastener 22 at one end of the strip assembly is snap inserted into a hole 14 and the entire strip, which is cut to a length equal to the desired perimeter is secured in place all around the perimeter of the door, each successive fastener being snapped into its hole 14. If necessary the strip assembly is slightly stretched between the holes 14 to provide for insertion of the fastener shank, and in practice the fasteners are preferably longitudinally underspaced on the strip assembly, that is they are spaced a slight distance less than the theoretical hole distance at 14 so that the entire strip assembly on the door will be under some some tension longitudinally which aids in holding it onto the support.

When the shank of the fastener is pressed into the support hole 14 the diverging leg edges 26 and 27 engage the sides of the hole 14 and the shank is compressed in the plane of Figure 4 slightly until it is more than half way through the hole. Then it re-expands as the assembly is further pressed into position on the door. In the assembled position the surfaces 15 and 16 are tightly pressed against each other and the converging edges 28 and 29 of the compressed shank engage the edges of the hole 14 to exert a force component lengthwise of the shank which tends to maintain and draw the fastener inwardly of the hole 14 and thereby tend to pull the back face 18 of the rubber strip into tight engagement with surface 15. This not only seals the holes 14 but effectively prevents entry of dirt and moisture all along the interface between the strip assembly and surface 15.

Once in place the weather strip assembly is securely anchored. It has been demonstrated by tests that the foregoing assembly of fastener and rubber weather strip is so effective that the rubber of the lips 35 and 36 will tear away in a direct pull before the fastener will leave the face 15. If the weather strip must be removed during the life of the car, as for some repair purpose, new fasteners can readily be installed along its length if the fasteners 22 are broken or otherwise damaged during the disassembly.

It is of course immaterial whether surface 15 and holes 14 are on the closure member or around the opening to be cloesd, as the parts are merely reversed.

Figures 8–10 illustrate a further embodiment of the invention. Here the sponge rubber body of the strip 41 is of different shape than that at 16 but the general purpose is the same.

The back face of the rubber body 41 is preferably flat and entirely along this back face is permanently bonded as by vulcanization or adhesive a strip of muslin or other fabric 43 which is so cut that its bias permits sufficient longitudinal stretch of the assembly when the strip is being snapped into place along the periphery of the closure or closure member.

At spaced intervals along this assembly and between fabric strip 43 and face 42 are located a series of plates 44 of thin sheet metal each provided at its corners with sharp prongs 45 preferably integrally struck out of the sheet metal of the plate and which enter the fabric strip 43 and are bent over to clinch the metal plate in position along the assembly. These metal plates 44 are attached to the fabric strip 43 prior to the latter's incorporation with the rubber body 41. Each metal plate 44 is formed with a generally central elongated slot 46 which is adapted to removably receive a fastener 47 for attaching the entire strip assembly to the support by thrusting the shank of the fastener through holes such as at 14 in Figure 3. The particular fastener that is employed in the illustration of this embodiment of the invention is the snap fastener disclosed in United States Letters Patent No. 1,679,266 issued July 31, 1928. This is a conventional fastener made from a single length of wire having the intermediate portion thereof looped into a flat head 48 lying in a plane, and the ends extending out of the head as legs of a shank 49. The shank legs have outer diverging portions 49 and 51 and inner converging portions 52 and 53 that are integrally joined with the head, and it functions like the shank of fastener 22 in the assembly.

In the assembly the fabric layer 43 is cut away overlying the slots 46 and the fasteners 47 are mounted in the assembly simply by inserting the head 48 of the fastener 47 through the slot 46 and rotating it through about a quarter of a turn so that it cannot be pulled directly out of the slot. In the assembly the strip 43 is preferably vulcanized to the surface 42 only in the spaces between the plates 44 in order that the head of the fastener may underlie a portion of the metal plate when it is rotated into final position and the bottom surfaces of the metal plates 44 will not be vulcanized to the rubber which might prevent such rotation of the fastener.

A major advantage of this form of the invention is that standard mass production fasteners are used and they pull the entire weatherstrip assembly into tight engagement with the support. The longitudinal slot 46 permits the necessary slight tilting of the head 48 of the fastener which enables it to be slipped under one edge of the slot and then rotated a quarter of a turn to final position, and it also permits slight shift of the fastener lengthwise of the weather strip which affords a further adjustment for adapting the weatherstrip assembly to the holes 14 in the support. As in the earlier embodiment of the invention the strip is attached by snapping the fasteners in succession into the successive holes 14 along a support 13.

The fastener shown in Figures 11 and 12 may be used in the T-slotted rubber body 16 like the fastener of Figures 4–7 and it comprises similar spaced flat wings 54 and 55 lying in the same plane and joined by an integral narrow bridge 56. Midway of its length bridge 56 is formed with an integral stud projection 57 comprising integral legs 58 and 59 extending from opposite sides. As shown in Figure 12 these legs diverge adjacent the bridge and then converge at their free ends, and the lower end of leg 58 is formed with a rounded tip 61 extending beneath and slightly upwardly of the lower end of leg 59 to facilitate entry into the holes 14 in the support structure. On the stud side wings 54 and 55 are formed with sharp projections 63 for anchoring to the weather strip lips.

This fastener which is preferably made from a single piece of metal differs essentially from that of Figures 4–7 in that it is rigid longitudinally of the weatherstrip, the stud legs displacing toward each other laterally of the weatherstrip, and re-expanding as they are pushed through openings 14. In the Figure 4–7 form of fastener, the stud legs compress and expand in a direction longitudinally of the weatherstrip.

Referring now to Figures 13 and 14, a suitably shaped body 64 of sponge rubber or the like serves as the weatherstrip and in its flat rear surface 65 is imbedded, as by vulcanization, a continuous strip length of metal 66. Sheet metal strip 66 is about half as wide as body 64 and is coextensive along its entire length. Strip 66 comprises along its length alternate longitudinally rigid plate sections 67 spaced by integral longitudinally flexible sections 68. In the disclosed embodiment flexible strip sections 68 are formed by stamping out the strip between the plate sections 67 to provide relatively narrow sinuous or zig-zag bands 69 that have limited stretch longitudinally of the body 64 to permit the weatherstrip assembly to be slightly stretched if necessary during mounting on the supporting frame.

Each plate section 67 of the strip is formed with a socket opening 71 for receiving the head of a detachable fastener such as that illustrated at 47 in Figure 13. Socket opening 71 is integrally formed in the metal strip by making parallel transverse cuts corresponding to edges 72 and 73 and depressing the metal between those cuts down out of the plane of the plate 67 to provide the loop 74 shown in Figure 14. The fastener 47 is attached by inserting the edge of head 48 through opening 71 and rotating it 90°, similarly to the mode of attachment through slot 46 in Figure 8. If the openings 71 are covered or partially covered with rubber during the vulcanization, the rubber can be cut away to permit the fasteners to be inserted, and even though some rubber may be disposed within the loop 74 it is so soft that it will give enough so that the fastener head can be inserted as described.

The fasteners 47 may be mounted in sockets 71 before the strip 66 is bonded to the rubber body 64, and this is probably preferable in mass production. In such event the entire strip 66 is imbedded below the surface 65, the rubber being molded about it. Even though the rubber extends over the fastener heads, it is possible to readily detach any of these fasteners 47, cutting the rubber slightly if necessary, and replace them with others. Where the fasteners are to be mounted in sockets 71 after the strip 66 has been bonded to the rubber, the strip 66 is usually located closer to surface 65 as above explained.

Figures 15–17 illustrate a further embodiment of the invention wherein an elongated sponge rubber or like resilient strip body 75 is formed along its entire rear face with a continuous T-slot having a wide bridge portion 76 and providing a narrow continuous opening 77 on opposite sides of which are flexible rubber lips 78 and 79.

Along the entire length of the weatherstrip, re-enforcement wires 81 and 82 are imbedded in lips 78 and 79 respectively. These are preferably straight lengths of small diameter relatively stiff longitudinally inextensible steel wire and are preferably incorporated by molding, and they are preferably located as closely as possible to the edges of opening 77. These wires do not permit longitudinal stretch of the weatherstrip assembly but do not interfere with bending of the strip as around corners.

For attaching this weatherstrip assembly to the support I use a snap fastener 85 a series of which can be introduced at any desired points along the strip. The illustrated fastener has a chiefly flat head 86 of generally H-shape and a spring stud or shank consisting of two legs 87 and 88 integrally projecting at an angle from the head. Legs 87 and 88 diverge near the head and then converge like the stud of the fastener of Figure 12, and the lower end of leg 87 is substantially J-shaped providing a rounded tip 89 extending under the end of leg 88. This provides ready entry into holes 14 of the support and the fasteners of course are attachable or detachable with respect to the weather strip and may be moved along the T-slot to align with the holes 14 of the support. Along its outer edges as illustrated best in Figure 17 the fastener head is turned to provide flanges 91 which are substantially parallel and project out of the plane of the head. When the weatherstrip is attached to the support with the shank legs thrust through holes 14 flanges 91 grip the rubber body firmly. If desired these flanges could be serrated for increasing the gripping action.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claim are therefore intended to be embraced therein.

What is claimed and desired to be secured by United States Letters Patent is:

A sealing strip assembly comprising an elongated body of relatively soft resilient material formed on a surface to engage under pressure with a part to be sealed and provided along another surface with a continuous substantially T-shaped slot with the cross portion of the slot located within the body so as to provide along said other surface a continuous relatively narrow opening and continuous flexible lips all along the edges of said narrow opening, and a straight stiff reenforcing metal wire imbedded along and only in each said lip, said wires extending generally side by side throughout the entire length of the weatherstrip assembly and permitting such flexure of the lips as may be necessary for insertion or removal of a snap fastener head at any location along said slot, said wires reenforcing said lips against pull between said snap fastener heads and the strip assembly transversely of said strip assembly.

References Cited in the file of this patent
UNITED STATES PATENTS

| | | |
|---|---|---|
| 1,695,682 | Creamer | Dec. 18, 1928 |
| 2,139,329 | Fessler | Dec. 6, 1938 |
| 2,165,412 | Place | July 11, 1939 |
| 2,219,382 | Conlon | Oct. 29, 1940 |
| 2,263,806 | Hammerl | Nov. 25, 1941 |
| 2,521,354 | Flora | Sept. 5, 1950 |
| 2,596,780 | Meyers et al. | May 13, 1952 |
| 2,607,965 | Gagnier | Aug. 26, 1952 |
| 2,612,665 | Scott | Oct. 7, 1952 |
| 2,657,438 | Sparagen | Nov. 3, 1953 |
| 2,754,561 | Bedford | July 17, 1956 |